W. V. TURNER.
LOCOMOTIVE BRAKE APPARATUS.
APPLICATION FILED JULY 27, 1915.
1,183,911.
Patented May 23, 1916.
2 SHEETS—SHEET 1.
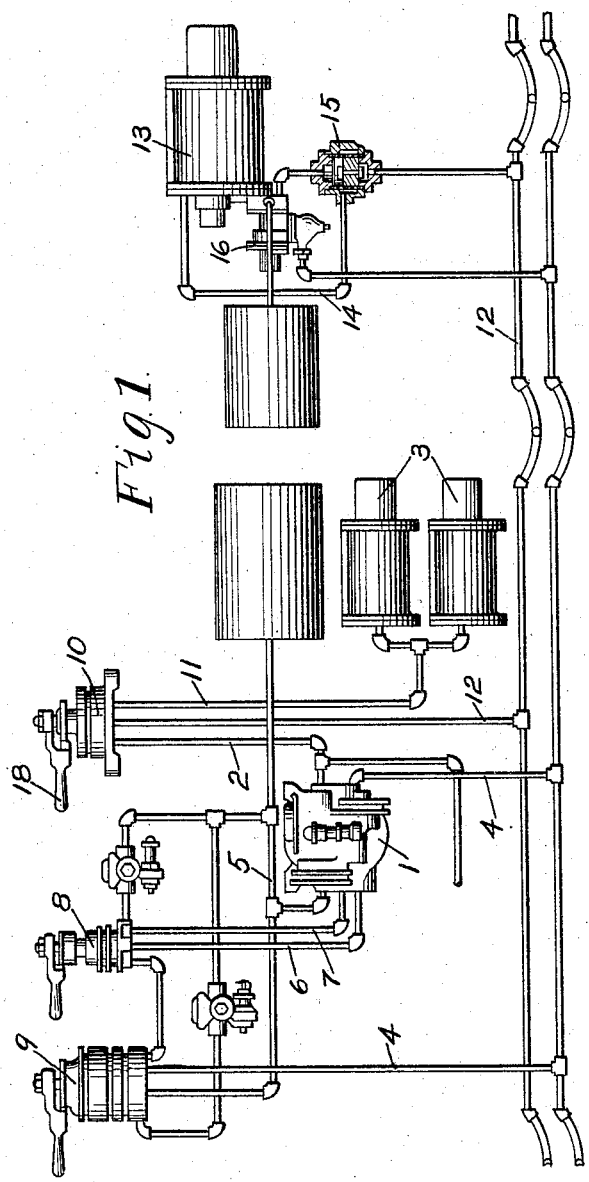
WITNESSES
H. W. Crowell.
G. M. Shuurts.
INVENTOR
Walter V. Turner
by Wm. M. Cady
Att'y.

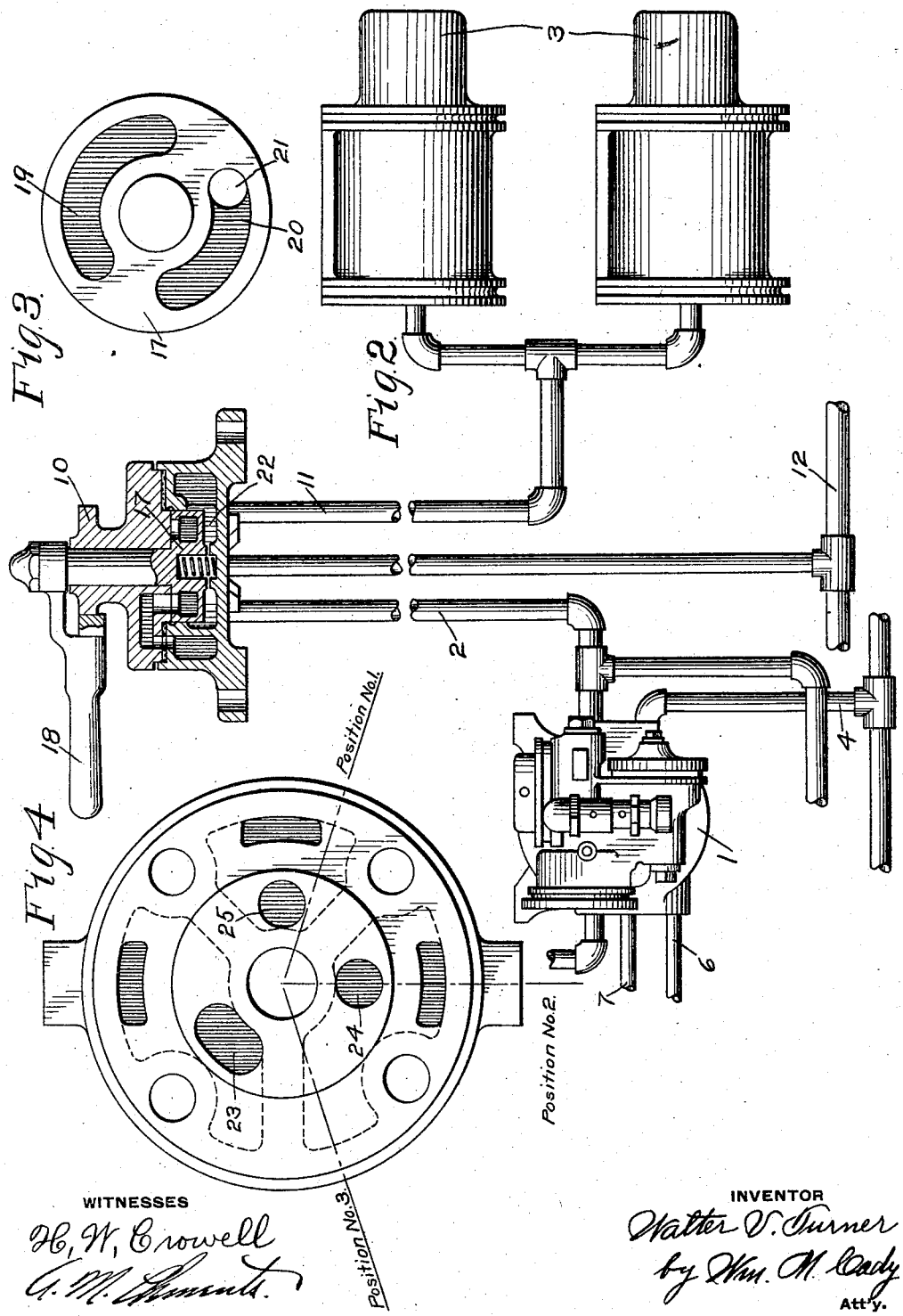

UNITED STATES PATENT OFFICE.

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

LOCOMOTIVE BRAKE APPARATUS.

1,183,911.  Specification of Letters Patent.  Patented May 23, 1916.

Application filed July 27, 1915. Serial No. 42,129.

*To all whom it may concern:*

Be it known that I, WALTER V. TURNER, a citizen of the United States, residing at Wilkinsburg, in the county of Allegheny and State of Pennsylvania, have invented new and useful Improvements in Locomotive Brake Apparatus, of which the following is a specification.

This invention relates to fluid pressure brakes, and more particularly to a combined automatic and straight air brake for controlling the brakes on the engine and train.

In a number of prior patents I have shown and described a locomotive and train brake equipment known as the "E T" locomotive brake equipment such, for example, as Patent No. 1,130,448, dated March 2, 1915. This equipment employs a so-called distributing valve device, an automatic brake valve, and an independent brake valve. By manipulation of the automatic brake valve, the brakes can be applied on the engine and train in the usual manner, except that the brakes on the locomotive are controlled by the distributing valve device. The brakes on the locomotive may also be controlled independently of the train brakes by manipulation of the independent brake valve, so that the brakes may at one time be applied on the engine while released on the train and at another time applied on the train while released on the engine.

In some cases, it is desired to control the brakes on the train by straight air, as well as the brakes on the locomotive and the principal object of my present invention is to provide an equipment for accomplishing this result while retaining all the features of the previous E T equipment.

In the accompanying drawings; Figure 1 is a diagrammatic view of a locomotive brake equipment connected up to a car brake equipment and embodying my invention; Fig. 2 an enlarged view of a portion of the locomotive brake apparatus shown in Fig. 1, showing the additional brake valve device in section; Fig. 3 a face view of the rotating valve of the additional brake valve; and Fig. 4 a plan view of the rotary valve seat.

The locomotive brake equipment may include the parts heretofore employed in the E T locomotive brake, as shown in Fig. 1 of the drawings, and comprising a distributing valve device 1 having a pipe 2 for supplying and releasing fluid to and from the locomotive brake cylinders 3, a brake pipe connection 4, a main reservoir pipe 5, pipes 6 and 7, leading to the independent brake valve 8, and an automatic brake valve 9.

According to my invention, an additional brake valve device 10 is provided, having ports for controlling communication through the distributing valve supply pipe 2, a pipe connection 11 leading to the locomotive brake cylinders 3, and a straight air pipe 12. The straight air pipe 12 extends through the train and is adapted to communicate with the car brake cylinder 13 through a pipe 14 and past a double check valve 15 which also controls communication from the car triple valve device 16 to the brake cylinder.

The additional brake valve device 10 may be provided with a rotary valve 17 having an inverted seat and adapted to be operated by a brake valve handle 18. The rotary valve 17 has a cavity 19 and a cavity 20 with a through port 21 opening into the rotary valve chamber 22, said cavities being adapted to control ports in the rotary valve seat as follows: a port 23 leading to the atmosphere, a port 24 leading to locomotive brake cylinder pipe 11, and a port 25 leading to the straight air pipe 12. In addition, the distributing valve supply and release pipe 2 opens into the rotary valve chamber 22. The rotary valve has three positions, and in one position cavity 20 registers with straight air port 25, while cavity 19 connects locomotive brake cylinder port 24 with exhaust port 23. In the next position of the brake valve, cavity 20 connects locomotive brake cylinder port 24 with straight air port 25, and in the third position, cavity 19 connects straight air port 25 with exhaust port 23, while cavity 20 registers with locomotive brake cylinder port 24. It will thus be seen that in the first position, the distributing valve supply and release pipe is connected to the straight air pipe, while the locomotive brake cylinder pipe is connected to the atmosphere, so that if the independent brake valve 8 is manipulated in the usual manner, the distributing valve device 1 will be operated to supply or release fluid directly to and from the car brake cylinders, thus permitting the train brakes to be applied and released by straight air while the locomotive brakes remain released. In the second position, the distributing valve pipe 2 is connected to the locomotive brake cylinders as well as the straight air pipe, and consequently, in this position, the brakes will be applied or released on the engine and train, by manipulation of the independent brake valve 8. In the third position of the additional brake valve 10, the distributing valve pipe 2 is connected to the locomotive brake cylinders 3, while the straight air pipe 12 is connected to the atmosphere, so that when the independent brake valve is manipulated in this position, the brakes will be applied or released on the locomotive, while the train brakes will remain released. When the additional brake valve is in the last mentioned position, it will be noted that the locomotive brake cylinders are connected to the distributing valve device as in the ordinary E T equipment, so that, if desired, the automatic brake valve may be manipulated to effect the automatic application and release of the brakes on the locomotive and train as heretofore, the double check valve 15 on the car being operated by flow of fluid from the triple valve device in applying the brakes to close communication from the brake cylinder 13 to the straight air pipe 12, so that fluid supplied to the car brake cylinder cannot escape to the atmosphere through the straight air pipe.

Having now described my invention, what I claim as new and desire to secure by Letters Patent, is:

1. In a fluid pressure brake, the combination with a straight air pipe for supplying fluid to apply the brakes on the train, a pipe for supplying fluid to apply the brakes on the engine, and an independent brake valve for controlling the supply of fluid to said pipes, of an additional brake valve adapted in one position to establish communication for supplying fluid to both pipes upon manipulation of the independent brake valve.

2. In a fluid pressure brake, the combination with a straight air pipe for supplying fluid to apply the brakes on the train, a pipe for supplying fluid to apply the brakes on the engine, and an independent brake valve for controlling the supply of fluid to said pipes, of an additional brake valve adapted in one position to establish communication for supplying fluid to both pipes upon manipulation of the independent brake valve, in another position to establish communication for supplying fluid to the straight air train pipe only, and in a third position to the engine pipe only.

3. In a fluid pressure brake, the combination with a straight air pipe for supplying fluid to apply the brakes on the train, a pipe for supplying fluid to apply the brakes on the engine, and an independent brake valve for controlling the supply of fluid to said pipes, of an additional brake valve adapted in one position to establish communication for supplying fluid to both pipes upon manipulation of the independent brake valve, in another position to establish communication for supplying fluid to the straight air pipe while connecting the engine pipe to the atmosphere, and in a third position to supply fluid to the engine pipe, with the straight air train pipe connected to the atmosphere.

4. In a fluid pressure brake, the combination with a distributing valve device for controlling the supply of fluid to apply the brakes and an independent brake valve for supplying fluid to operate said distributing valve, of a straight air pipe through which fluid is supplied to apply the brakes on the train, a pipe for supplying fluid to apply the brakes on the engine, and an additional brake valve for establishing communication in one position from the distributing valve to both pipes and in another position to only one of said pipes.

5. In a fluid pressure brake, the combination with a distributing valve device for controlling the supply of fluid to apply the brakes and an independent brake valve for supplying fluid to operate said distributing valve of a straight air pipe through which fluid is supplied to apply the brakes on the train, a pipe for supplying fluid to apply the brakes on the engine, and an additional brake valve for establishing communication in one position from the distributing valve to both pipes, in another position to the straight air train pipe only, and in a third position to the engine pipe only.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."